United States Patent
Ohta

(10) Patent No.: US 9,833,706 B2
(45) Date of Patent: Dec. 5, 2017

(54) STORAGE MEDIUM HAVING INFORMATION PROCESSING PROGRAM STORED THEREIN, INFORMATION PROCESSING DEVICE, AND COORDINATE CALCULATION METHOD

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1442 days.

(21) Appl. No.: 12/614,720

(22) Filed: Nov. 9, 2009

(65) Prior Publication Data

US 2011/0025614 A1 Feb. 3, 2011

(30) Foreign Application Priority Data

Jul. 29, 2009 (JP) .................................. 2009-176294

(51) Int. Cl.
| | |
|---|---|
| *G06F 3/0488* | (2013.01) |
| *A63F 13/426* | (2014.01) |
| *A63F 13/2145* | (2014.01) |
| *A63F 13/20* | (2014.01) |
| *A63F 13/40* | (2014.01) |
| *G06F 3/038* | (2013.01) |

(52) U.S. Cl.
CPC ............ *A63F 13/426* (2014.09); *A63F 13/06* (2013.01); *A63F 13/10* (2013.01); *A63F 13/2145* (2014.09); *G06F 3/038* (2013.01); *G06F 3/0488* (2013.01); *A63F 2300/1068* (2013.01); *A63F 2300/6045* (2013.01)

(58) Field of Classification Search
USPC .................................. 345/173, 156, 175–176
See application file for complete search history.

(56) References Cited

U.S. PATENT DOCUMENTS

| | | |
|---|---|---|
| 5,835,081 A | 11/1998 | Oka |
| 6,304,677 B1 | 10/2001 | Schuster |
| 2002/0113779 A1 | 8/2002 | Itoh et al. |

(Continued)

FOREIGN PATENT DOCUMENTS

| | | |
|---|---|---|
| EP | 0 762 265 A2 | 3/1997 |
| EP | 1 229 488 A2 | 8/2002 |

(Continued)

OTHER PUBLICATIONS (Above items were cited in Feb. 28, 2013 Office Action in counterpart Japanese patent application.).

(Continued)

*Primary Examiner* — William Boddie
(74) *Attorney, Agent, or Firm* — Nixon & Vanderhye P.C.

(57) ABSTRACT

A touch panel detects a point in one of a plurality of unit areas at which an input was made, the unit areas being arranged in a matrix in an instruction plane. A game apparatus repeatedly acquires detection coordinates for locating a unit area detected by a pointing device. Also, the game apparatus repeatedly calculates, in response to the acquisition of the detection coordinates, detailed coordinates by which a point can be represented with accuracy in more detail than by the detection coordinates. The detailed coordinates indicate a point in the direction of a unit area indicated by previously acquired detection coordinates, as viewed from a predetermined reference point within a unit area indicated by currently acquired detection coordinates.

19 Claims, 7 Drawing Sheets

(56) References Cited

U.S. PATENT DOCUMENTS

| | | | |
|---|---|---|---|
| 2008/0026843 A1 | 1/2008 | Nakasaka | |
| 2009/0091530 A1* | 4/2009 | Yoshida | 345/156 |
| 2009/0109178 A1* | 4/2009 | Kim et al. | 345/166 |
| 2010/0027912 A1* | 2/2010 | Wei | 382/299 |
| 2010/0073318 A1 | 3/2010 | Hu | |

FOREIGN PATENT DOCUMENTS

| | | |
|---|---|---|
| JP | 8-171450 A | 7/1996 |
| JP | 8-241170 A | 9/1996 |
| JP | 2002-259056 A | 9/2002 |
| JP | 2006-271782 | 10/2006 |

OTHER PUBLICATIONS

Office Action dated Oct. 7, 2014 in related U.S. Appl. No. 14/196,876.
Extended European Search Report and Written Opinion dated Feb. 19, 2014, issued in corresponding European Patent Application No. 09173509.2.

* cited by examiner

STORAGE MEDIUM HAVING INFORMATION PROCESSING PROGRAM STORED THEREIN, INFORMATION PROCESSING DEVICE, AND COORDINATE CALCULATION METHOD

CROSS REFERENCE TO RELATED APPLICATION

The disclosure of Japanese Patent Application No. 2009-176294, filed Jul. 29, 2009, is incorporated herein by reference.

BACKGROUND OF THE INVENTION

Field of the Invention

The present invention relates to storage media having an information processing program stored therein, information processing devices, and coordinate calculation methods, and more particularly the invention relates to a storage medium having stored therein an information processing program in which inputs are made using a pointing device, as well as an information processing device and a coordinate calculation method using a pointing device for input.

Description of the Background Art

Patent Document 1 (Japanese Laid-Open Patent Publication No. 2006-271782) discloses a game apparatus using a touch panel as a pointing device. Atypical touch panel as described in Patent Document 1, for example, when a touch pen or a finger contacts with its input screen, detects a contact point, and outputs coordinates indicating the contact point. The game apparatus performs a game process using coordinates outputted from the touch panel as input points.

Conventionally, game apparatuses can simply recognize input points with the same accuracy as the touch panel can recognize the points. Accordingly, when the user draws a trajectory on the touch panel, the trajectory cannot be recognized in more detail than can be recognized by a coordinate value outputted by the touch panel. In this manner, conventional methods for detecting an input point by a pointing device do not allow information processing devices to recognize the input point in more detail than can be recognized with the detection accuracy of the pointing device.

SUMMARY OF THE INVENTION

Therefore, an object of the present invention is to provide a storage medium having stored therein an information processing program capable of recognizing in more detail a point inputted to an instruction plane of a pointing device, as well as to provide an information processing device and a coordinate calculation method allowing such detailed point recognition.

The present invention employs the following features (1) to (12) to attain the object mentioned above.

(1) The present invention is directed to a computer-readable storage medium having stored therein an information processing program to be executed by a computer in an information processing device capable of acquiring a detection result from a pointing device for detecting an input to an instruction plane. The pointing device detects a point in one of a plurality of unit areas at which an input was made, the unit areas being arranged in a matrix in the instruction plane. The information processing program causes the computer to function as acquisition means and detailed coordinate calculation means. The acquisition means repeatedly acquires detection coordinates for locating the unit area detected by the pointing device. The detailed coordinate calculation means repeatedly calculates, in response to the acquisition of the detection coordinates by the acquisition means, detailed coordinates by which a point in the instruction plane can be represented with accuracy in more detail than by the detection coordinates. Also, the detailed coordinate calculation means calculates detailed coordinates indicating a point in the direction of a unit area indicated by previously acquired detection coordinates, as viewed from a predetermined reference point within a unit area indicated by currently acquired detection coordinates.

The "pointing device" as above encompasses a touch panel as described in an embodiment to be described later, as well as input devices, such as mouse and touch pad, and also encompasses input systems for remotely specifying on-screen points as described in the "other embodiments" section to be described later.

The "information processing device" as above encompasses game apparatuses as described in the embodiment to be described later, as well as computers performing information processing by executing an arbitrary computer program. Also, the "information processing device" may or may not be of hand-held type.

The "information processing program" as above encompasses game programs as described in the embodiment to be described later, as well as application programs to be executed by personal computers and mobile terminals.

The "acquisition means" as above is a means for repeatedly acquiring detection coordinates, and may acquire information (data) regarding the detection coordinates directly from the pointing device or indirectly from the pointing device through a predetermined interface circuit. Also, the "acquisition means" may acquire detection coordinates once every predetermined time period, as in the process of step S3 in the embodiment to be described later, or the "acquisition-means" may acquire detection coordinates at irregular times.

The "detection coordinates" are coordinates detected by the pointing device and used for locating a unit area in which an input was made. While the "detection coordinates" in the embodiment to be described later are integral coordinate values of 0 or more representing a point in the instruction plane, the "detection coordinates" may be any discrete numerical values representing a point in the instruction plane with arbitrary detection accuracy.

The "detailed coordinates" represent a point in the instruction plane with accuracy in more detail than can be represented by the detection coordinates, such that any digits that cannot be represented by the detection coordinates are represented as specific numerical values. While the "detailed coordinates" in the embodiment to be described later represent a point in the instruction plane to the first decimal place, the point in the instruction plane may be represented by any values so long as it is represented with more detailed accuracy than by the detection coordinates.

While the "detailed coordinate calculation means" calculates detailed coordinates in response to the acquisition of the detection coordinates by the acquisition means, the detailed coordinate calculation means may acquire detailed coordinates each time the acquisition means acquires detection coordinates, as in the embodiment to be described later. In addition, the manner by which the "detailed coordinate calculation means" calculates the detailed coordinates may be the same as in the process of step S15 in the embodiment to be described later, the calculation method as shown in FIG. 6 or 7 to be described later, or any one of the calculation methods with features (2) to (7) described in this section.

While the "predetermined reference point" in the embodiment to be described later is the center of a unit area, the "predetermined reference point" may be any point so long as it is predetermined in the unit area, and may be a "point corresponding to the center" to be described later.

Also, the "point in the direction of a unit area indicated by previously acquired detection coordinates" as above is intended to specify a direction from a predetermined point, and the point in such a direction may be inside or outside the "unit area indicated by previously acquired detection coordinates" or may border on such a unit area. In addition, the aforementioned point may be inside or outside the "unit area indicated by currently acquired detection coordinates" or may border on such a unit area.

Also, the direction "toward a unit area indicated by the previously acquired detection coordinates" as above is a direction approaching the unit area, and the direction may be a direction toward a reference point in the unit area or a predetermined point that lies within or borders on the unit area.

According to feature (1) above, an input point can be recognized by detailed coordinates, which can represent a point in more detail than can be represented by detection coordinates, so that a point inputted to the instruction plane can be recognized in more detail. Also, the detailed coordinates are calculated as representing a point in the direction of a unit area indicated by previously acquired detection coordinates, as viewed from a reference point in a unit area indicated by currently acquired detection coordinates. In this manner, when the detailed coordinates are calculated, each detailed coordinate point is a point closer to the previous unit area with respect to the reference point, and therefore intervals between detailed coordinate points are shorter than those between detection coordinate points (intervals between some detailed coordinates points may remain the same as those between detection coordinate points). Accordingly, a trajectory connecting detailed coordinate points as calculated above is smoother than a trajectory simply connecting detection coordinate points. As a result, the input point indicated by the detailed coordinates is expected to be closer to a point at which the user actually made an input as compared to the input point indicated by the detection coordinates, and therefore could probably represent the user input with higher precision. That is, according to the present invention, it is possible to calculate input coordinates corresponding to a series of inputs to the instruction plane in more detail and with higher precision.

(2) Also, the detailed coordinate calculation means may calculate detailed coordinates indicating a point in the direction of the unit area indicated by the previously acquired detection coordinates, as viewed from a point corresponding to the center of the unit area indicated by the currently acquired detection coordinates.

As for the "point corresponding to the center of a unit area", in some cases, the detailed coordinates might not represent the center with precision depending on numerical values that can be represented by the detailed coordinates, and therefore the aforementioned point may be a point other than the exact center, as shown below:

the closest point to the center among the points that can be represented by the detailed coordinates;
the closest point to the center among the points that can be represented by the detailed coordinates and represented by a coordinate value smaller than a coordinate value representing the center; or
the closest point to the center among the points that can be represented by the detailed coordinates and represented by a coordinate value greater than a coordinate value representing the center.

According to feature (2) above, the point to be referenced for calculating (setting) detailed coordinates is set to be approximately the center of a detection area, and therefore the detailed coordinates can be set with equal accuracy in any of the upward, downward, leftward, and rightward directions. Accordingly, the detailed coordinates can be calculated under approximately the same conditions regardless of the direction of input, making it possible to calculate the input point with higher precision.

(3) The detailed coordinate calculation means may calculate detailed coordinates indicating a point on a line, excluding both ends thereof, the line connecting a point indicated by previously calculated detailed coordinates and the point corresponding to the center of the unit area indicated by the currently acquired detection coordinates.

The "point on a line, excluding both ends thereof" as above refers to a point on the line, excluding the "point indicated by the previously calculated detailed coordinates" and the "point corresponding to the center of the unit area indicated by the currently acquired detection coordinates". Accordingly, The "point on a line, excluding both ends thereof" includes points as described in (5) to (7) below.

According to feature (3) above, the detailed coordinates can be readily calculated based on the point indicated by the previously calculated detailed coordinates and the point corresponding to the center of the unit area indicated by the currently acquired detection coordinates.

(4) The detailed coordinate calculation means may calculate detailed coordinates indicating a point on the line, excluding both ends thereof, the line connecting the point corresponding to the center of the unit area indicated by the previously acquired detection coordinates and the point corresponding to the center of the unit area indicated by the currently calculated detailed coordinates.

According to feature (4) above, the detailed coordinates can be readily calculated based on the point corresponding to the center of the unit area indicated by the previously acquired detection coordinates and the point corresponding to the center of the unit area indicated by the currently calculated detailed coordinates.

(5) The detailed coordinate calculation means may calculate detailed coordinates indicating a point on the line as described in (3) or (4) in the unit area indicated by the currently acquired detection coordinates.

According to feature (5) above, the unit area indicated by the detection coordinates matches calculated detailed coordinates, and therefore the detailed coordinates precisely represent the point at which an input is currently being made. Accordingly, it is possible to precisely calculate the user's input point. Also, according to feature (5) above, the detailed coordinates calculated in response to the acquisition of the detection coordinates indicate a point in the unit area indicated by the detection coordinates, and therefore it can be said that a detailed point can be calculated in real-time in response to the acquisition of the detection coordinates. That is, it is possible to calculate in real-time input points corresponding to a series of inputs to the instruction plane.

(6) The detailed coordinate calculation means may calculate detailed coordinates indicating a point located on the line as described in (3) or (4) and inscribed in the unit area indicated by the currently acquired detection coordinates.

The "point inscribed in a unit area" (where the vertical and horizontal directions of unit areas arranged in a matrix correspond to the directions of the coordinate axes of a coordinate system for the detailed coordinates, and the detailed coordinates are discrete numerical values) is a point in a unit area at which the value of at least one element of a coordinate point is the maximum or minimum of the coordinate values that can be represented by the detailed coordinates.

According to feature (6) above, the detailed coordinates correspond to a point inscribed in a unit area indicated by the currently acquired detection coordinates, i.e., the closest point to a unit area indicated by the previously acquired detection coordinates among all points in the unit area indicated by the currently acquired detection coordinates. Here, from the viewpoint of accuracy of the detailed coordinates, it is preferable that the current detailed coordinates correspond to a paint in the unit area indicated by the currently acquired detection coordinates, as described in (5) above. On the other hand, from the viewpoint of the trajectory represented by detailed coordinates, it is preferable that the point be close to the unit area indicated by the previously acquired detection coordinates because the closer the point is to the unit area the smoother the trajectory connecting the detailed points is. As a result, according to feature (6) above, the current detailed coordinates are set to be as close to the previous detailed coordinates as possible while being constrained within the current unit area, and therefore it is possible to calculate preferable detailed coordinates considering both of the above two viewpoints.

(7) The detailed coordinate calculation means may calculate detailed coordinates indicating a point located on the line within a predetermined distance from an intersection between the line and a perimeter of the unit area indicated by the currently acquired detection coordinates.

The "point located on a line at a predetermined distance from the intersection between the line and a perimeter of a unit area indicated by the currently acquired detection coordinates" as above refers to a point on a segment of the line that has its center at the intersection and its end points at the predetermined distance from the center. For example, referring to FIG. 7, the "point located on a line at a predetermined distance from the intersection between the line and a perimeter of a unit area indicated by the currently acquired detection coordinates" as above is a point on the line connecting points 33 and 34. Note that the "point located on a line at a predetermined distance from the intersection between the line and a perimeter of a unit area indicated by the currently acquired detection coordinates" encompasses at least points inscribed in or circumscribed about the unit area.

According to feature (7) above, the detailed coordinates represent a point in the vicinity of a perimeter of a unit area indicated by the currently acquired detection coordinates. Here, when the point represented by the detailed coordinates is close to the point represented by the previously calculated detailed coordinates ((3) above) or the point corresponding to the center of a unit area indicated by the previously acquired detection coordinates ((4) above), the point represented by the detailed coordinates is located away from the unit area indicated by the currently acquired detection coordinates, resulting in an inaccurate point being represented by the detailed coordinates. On the other hand, when the point represented by the detailed coordinates is close to the center of the unit area indicated by the currently acquired detection coordinates, a trajectory indicated by the detailed coordinates is unsmooth, resulting in reduced effects of the present invention. On the other hand, according to feature (7) above, an appropriate point can be calculated and represented by detailed coordinates so as not to cause the above two problems.

(8) The acquisition means may acquire information as a detection result by the pointing device when no input is made to the instruction plane, the information indicating that no input is made to the instruction plane. In this case, the detailed coordinate calculation means calculates detailed coordinates indicating a predetermined point in the unit area indicated by detection coordinates previously not acquired but currently acquired by the acquisition means.

While the "predetermined point" in the embodiment to be described later is the center of the unit area, but the "predetermined point" may be any point previously set within the unit area, e.g., a point corresponding to the center of the unit area.

According to feature (8) above, detailed coordinates representing an appropriate point can be calculated even when the detailed coordinates are calculated based on the first of a series of detection coordinates to be acquired.

(9) The detailed coordinate calculation means may calculate detailed coordinates indicating the same point as the previously calculated detailed coordinates when the detection coordinates currently acquired by the acquisition means are the same as the previously acquired detection coordinates.

According to feature (9) above, even when the same detection coordinates are successively acquired, for example, as in the case where the user touches the instruction plane but does not move the touch point, detailed coordinates can be calculated so as to represent an appropriate point.

(10) The detailed coordinate calculation means may calculate the detailed coordinates such that numerical values that can be represented by the detection coordinates represent border points between the unit areas.

The wording "numerical values that can be represented by the detection coordinates represent border points between the unit areas" is intended to mean, for example, that the border points between the unit areas correspond to integer values when the detection coordinates can represent integer values as in the embodiment to be described later. Note that the "numerical values that can be represented by the detection coordinates" are not limited to integer values, and may be numerical values in, for example, hundreds column or higher, and in such a case, the border points between the unit areas are represented by numerical values which are multiples of 100.

According to feature (10) above, the border points between the unit areas are represented by numerical values that can be represented by detection coordinates. Accordingly, as for all points in one unit area, numerical values that can be represented by detection coordinates are equal in digit, and the digit of the numerical value that can only be represented by the detailed coordinates varies between the border points. In this case, the original detection coordinates can be obtained by dropping the digit that can only be represented by the detailed coordinates from the numerical values represented by the detailed coordinates. That is, according to feature (10) above, the original detection coordinates can be readily obtained from the detailed coordinates. Thus, it is possible to readily deal with processes using detailed coordinates as inputs as well as processes using detection coordinates as inputs, thereby increasing the versatility of the information processing program.

(11) The pointing device may be a touch panel.

According to feature (11) above, the present invention is applicable to information processing systems using a touch panel as an input device.

(12) The information processing program may cause the computer to further function as process execution means for executing a predetermined process using the detailed coordinates as inputs.

The "process execution means" may execute any processes so long as one or more detailed coordinates are used as inputs for information processing, and may execute not only game processes in the embodiment to be described later but also character recognition and trajectory display processes as described in the "other embodiments" section to be described later.

According to feature (12) above, various types of information processing can be performed using as inputs detailed coordinates representing points in more detail than coordinates detected by the pointing device. That is, various types of information processing can be performed using accurate input points.

Also, the present invention may be provided in the form of an information processing device having equivalent functions to the aforementioned information processing device. Note that in such an information processing device, the aforementioned means may be realized by a CPU executing the information processing program, or part or all of the aforementioned means may be realized by a specialized circuit included in the information processing device. Furthermore, the present invention may be realized as the same coordinate calculation method as that executed by the information processing device.

As described above, according to the present invention, by calculating detailed coordinates representing a point in the direction of a unit area indicated by previously acquired detection coordinates, as viewed from the center of a unit area indicated by currently acquired detection coordinates, it becomes possible to recognize in more detail input coordinates for a series of inputs to the instruction plane.

These and other objects, features, aspects and advantages of the present invention will become more apparent from the following detailed description of the present invention when taken in conjunction with the accompanying drawings.

DESCRIPTION OF THE PREFERRED EMBODIMENTS

[Hardware Configuration of the Game Apparatus]

A game program and game apparatus according to an embodiment of the present invention will be described with reference to the drawings. While the present invention can be achieved by the present program being executed in any information processing device using a pointing device such as a touch panel, the present embodiment will be described with respect to the case where a game apparatus 1 shown in FIG. 1 is used as an example of the information processing device.

Figure 1:
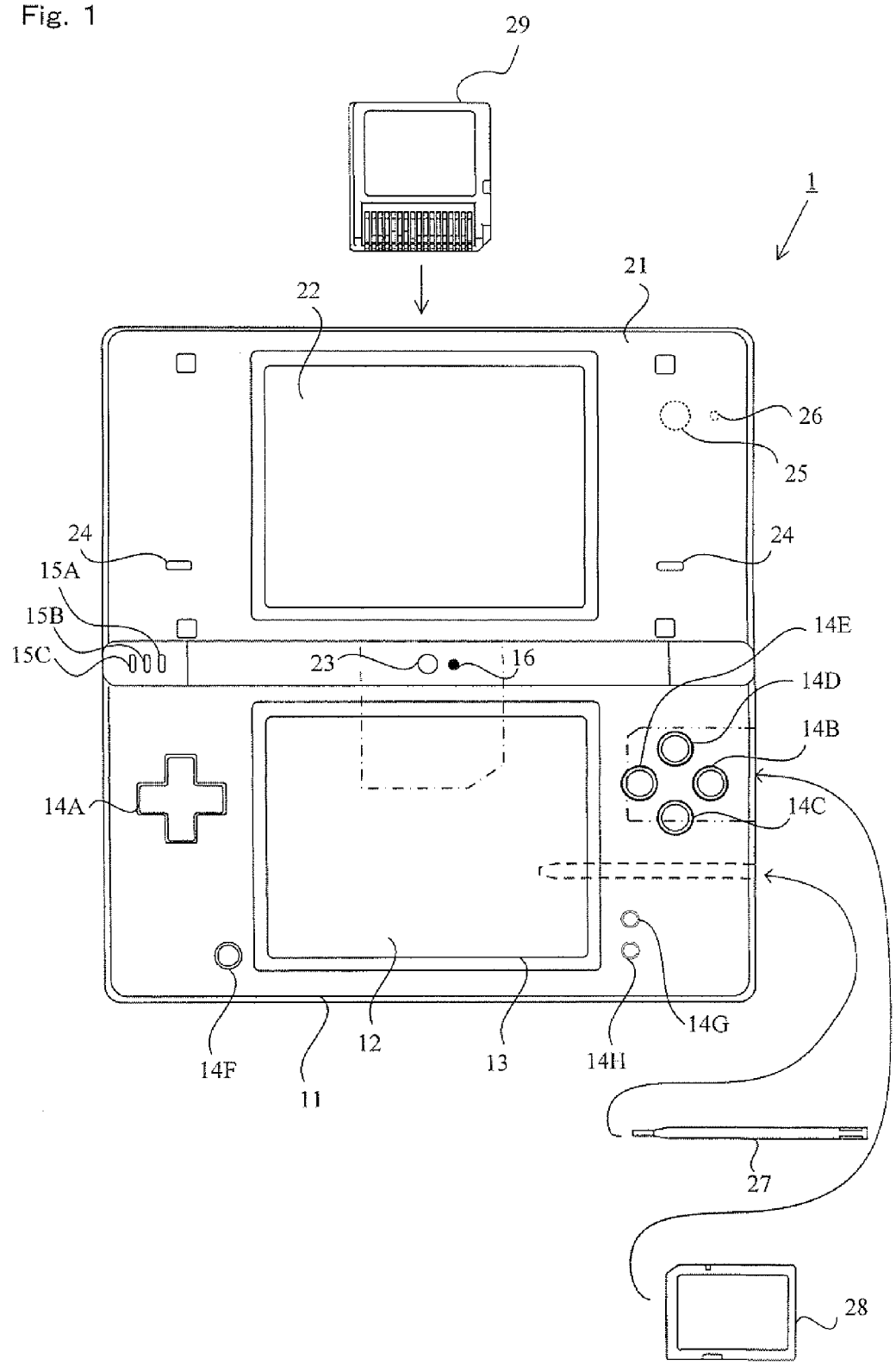
FIG. 1 is an external view of a game apparatus for executing a game program according to an embodiment of the present invention.

FIG. 1 is an external view of the game apparatus 1 for executing a game program according to the present embodiment. Here, a hand-held game apparatus is shown as an example of the game apparatus 1. Note that the game apparatus 1 includes a camera and functions as an imaging device for taking an image with the camera, displaying the taken image on the screen, and storing data for the taken image.

In FIG. 1, the game apparatus 1 is a foldable hand-held game apparatus, and the game apparatus 1 shown in the figure is unfolded (open state). The game apparatus 1 is structured in a size allowing the user to hold it with both hands, or even one hand, when unfolded.

The game apparatus 1 has a lower housing 11 and an upper housing 21. The lower housing 11 and the upper housing 21 are connected so as to be openable/closable (foldable). In the example of FIG. 1, the lower housing 11 and the upper housing 21 are each formed in the shape of a horizontally elongated rectangular plate, and connected so as to be pivotable at their common long side joint. Typically, the user uses the game apparatus 1 in open state. Also, when the user does not use the game apparatus 1, the game apparatus 1 is stored in closed state. In addition, in the example shown in FIG. 1, the game apparatus 1 can maintain not only the closed and open states but also its opening state via friction force generated at the joint at any angle that can be made by the lower housing 11 and the upper housing 21 between the closed and open states. That is, the upper housing 21 can remain stationary at an arbitrary angle with respect to the lower housing 11.

The lower housing 11 is provided with a lower LCD (Liquid Crystal Display) 12. The lower LCD 12 is horizontally long, and is arranged such that its longitudinal direction coincides with the longitudinal direction of the lower housing 11. Note that in the present embodiment, LCDs are used as display devices to be included in the game apparatus 1, but any other display devices, such as EL (Electro Luminescence) display devices, may be used. In addition, display devices of any resolution can be used for the game apparatus 1. Note that an image being taken by an internal camera 23 or an external camera 25 is displayed in real-time on lower LCD 12.

The lower housing 11 is provided with various operation buttons 14A to 14K and a touch panel 13 as input devices. As shown in FIG. 1, of all the operation buttons 14A to 14K, the direction input button 14A, the operation button 14B, the operation button 14C, the operation button 14D, the operation button 14E, the power button 14F, the start button 14G, and the select button 14H are provided at the inner principal surface of the lower housing 11. The inner principal surface is a surface placed on the interior side when the upper housing 21 and the lower housing 11 are folded. In the example shown in FIG. 1, the direction input button 14A and the power button 14F are provided to the left or right (in FIG. 1, to the left) of the lower LCD 12 provided at the center of the inner principal surface of the lower housing 11. In addition, the operation buttons 14B to 14E, the start button 14G, and the select button 14H are provided to the opposite side (in FIG. 1 to the right) of the lower LCD 12 on the inner principal surface of the lower housing 11. The direction input button 14A, the operation buttons 14B to 14E, the start button 14G, and the select button 14H are used for various operations on the game apparatus 1. For example, the direction input button 14A is used for selection operations and so on. The operation buttons 14B to 14E are used for setting and cancellation operations and so on. The power button 14F is used for turning ON/OFF the game apparatus 1.

Note that in FIG. 1, the operation buttons 14I to 14K are not shown. For example, the L button 14I is provided at the left edge of the upper surface of the lower housing 11, and the R button 14J is provided at the right edge of the upper surface of the lower housing 11. For example, the L button 14I and the R button 14J are used for imaging instruction operations (shutter operations) on the game apparatus 1 having an imaging function. Furthermore, the volume button 14K is provided at the left side surface of the lower housing 11. The volume button 14K is used for controlling the volume of a speaker included in the game apparatus 1.

Also, in addition to the operation buttons 14A to 14K, the game apparatus 1 further includes another input device, i.e., the touch panel 13, which is an exemplary input device allowing designation of an arbitrary point on the screen. The touch panel 13 is attached so as to cover the screen of the lower LCD 12. Note that in the present embodiment, the touch panel 13 is, for example, of a resistive film type. However, the touch panel 13 is not limited to the resistive film type, and may be of any type. Also, in the present embodiment, for example, the touch panel 13 has the same resolution (detection accuracy) as the lower LCD 12. However, the touch panel 13 is not necessarily required to be equal in resolution to the lower LCD 12. In addition, the lower housing 11 has an insertion opening (in FIG. 1, indicated by broken lines) provided in its right side surface. The insertion opening can store a touch pen 27 to be used for operating the touch panel 13. Note that any input to the touch panel 13 (touch input) is normally performed with the touch pen 27, but the touch pen 27 is not restrictive, and the touch panel 13 can be operated with the user's finger.

Also, the lower housing 11 has provided in the right side surface an insertion opening (in FIG. 1, indicated by two-dot chain lines) for storing a memory card 28. The insertion opening has provided therein a connector (not shown) for electrically connecting the game apparatus 1 and the memory card 28. The memory card 28 is, for example, an SD (Secure Digital) memory card removably attached to the connector. For example, the memory card 28 is used for storing (saving) images taken by the game apparatus 1 and reading into the game apparatus 1 images generated by other apparatuses.

Furthermore, the lower housing 11 has provided in its upper side surface an insertion opening (in FIG. 1, indicated by one-dot chain lines) for storing a memory card 29. This insertion opening also has provided therein a connector (not shown) for electrically connecting the game apparatus 1 and the memory card 29. The memory card 29 is a storage medium having a game program or suchlike stored therein, and is removably loaded into the insertion opening provided in the lower housing 11.

Three LEDs 15A to 15C are provided to the left of the joint between the lower housing 11 and the upper housing 21. Here, the game apparatus 1 is capable of wirelessly communicating with other equipment, and the first LED 15A is lit up while the game apparatus 1 is ON. The second LED 15B is lit up while the game apparatus 1 is being charged. The third LED 15C is lit up when wireless communication is established. Accordingly, the three LEDs 15A to 15C allow the user to know the statuses of the game apparatus 1, regarding ON/OFF of the power supply, battery charge, and communications.

On the other hand, the upper housing 21 is provided with an upper LCD 22. The upper LCD 22 is horizontally long, and is arranged such that its longitudinal direction coincides with the longitudinal direction of the upper housing 12. Note that as in the case of the lower LCD 12, any display device of any other type and resolution may be used instead of the upper LCD 22. Note that a touch panel may be provided over the upper LCD 22. The upper LCD 22 displays, for example, an operation instruction screen for teaching the user about the roles of the operation buttons 14A to 14K and the touch panel 13.

Also, the upper housing 21 is provided with two cameras (an internal camera 23 and an external camera 25). As shown in FIG. 1, the internal camera 23 is provided at the inner principal surface close to the joint of the upper housing 21. On the other hand, the external camera 25 is provided opposite to the side of the inner principal surface where the internal camera 23 is provided, i.e., the external principal surface of the upper housing 21 (the exterior surface of the game apparatus 1 in closed state; the back of the upper housing 21 shown in FIG. 1). Note that in FIG. 1, the external camera 25 is indicated by a broken circle. As a result, the internal camera 23 can take images of the direction in which the inner principal surface of the upper housing 21 is oriented, while the external camera 25 can take images of the direction opposite to the imaging direction of the internal camera 23, i.e., the direction in which the external principal surface of the upper housing 21 is oriented. In this manner, in the present embodiment, the two cameras, i.e., the internal and external cameras 23 and 25, are provided so as to take images in their respective directions opposite to each other. For example, the user can use the internal camera 23 to take images of a view from the game apparatus 1 toward the user, and also can use the external camera 25 to take images of a view in the opposite direction, i.e., from the user toward the game apparatus 1.

Note that a microphone (microphone 43 shown in FIG. 2) is provided as an audio input device under the inner principal surface close to the joint. In addition, a microphone hole 16 is provided in the inner principal surface close to the joint such that the microphone 43 can sense sound from outside the game apparatus 1. The microphone 43 and the microphone hole 16 are not necessarily required to be positioned at the joint. For example, the microphone 43 may be accommodated within the lower housing 11, and the microphone hole 16 may be provided in the lower housing 11 at a position corresponding to the position where the microphone 43 is accommodated.

Also, a fourth LED 26 (in FIG. 1, indicated by a broken circle) is provided at the external principal surface of the upper housing 21. The fourth LED 26 is lit up at the time the internal camera 23 or the external camera 25 takes an image (when the shutter button is pressed). Furthermore, the light is on while the internal camera 23 or the external camera 25 is taking a motion picture. As such, the fourth LED 26 allows any subject and bystander to know the game apparatus 1 took (or is taking) a picture.

Also, a sound hole 24 is provided to both the left and the right of the upper LCD 22 provided at the center of the inner principal surface of the upper housing 21. A speaker is accommodated within the upper housing 21 below each sound hole 24. The sound hole 24 is a hole for emanating the sound from the speaker to the outside of the game apparatus 1.

As described above, the upper housing 21 is provided with the internal and external cameras 23 and 25 configured to take images, as well as the upper LCD 22 acting as a display means for mainly displaying the operation instruction screen. On the other hand, the lower housing 11 is provided with the input devices (the touch panel 13 and the operation buttons 14A to 14K) for operational inputs to the game apparatus 1, and the lower LCD 12 acting as a display means for displaying taken images. Accordingly, when using the game apparatus 1, the user can see a taken image (an image taken by the camera) displayed on the lower LCD 12 and make inputs via the input devices while holding the lower housing 11.

Figure 2:
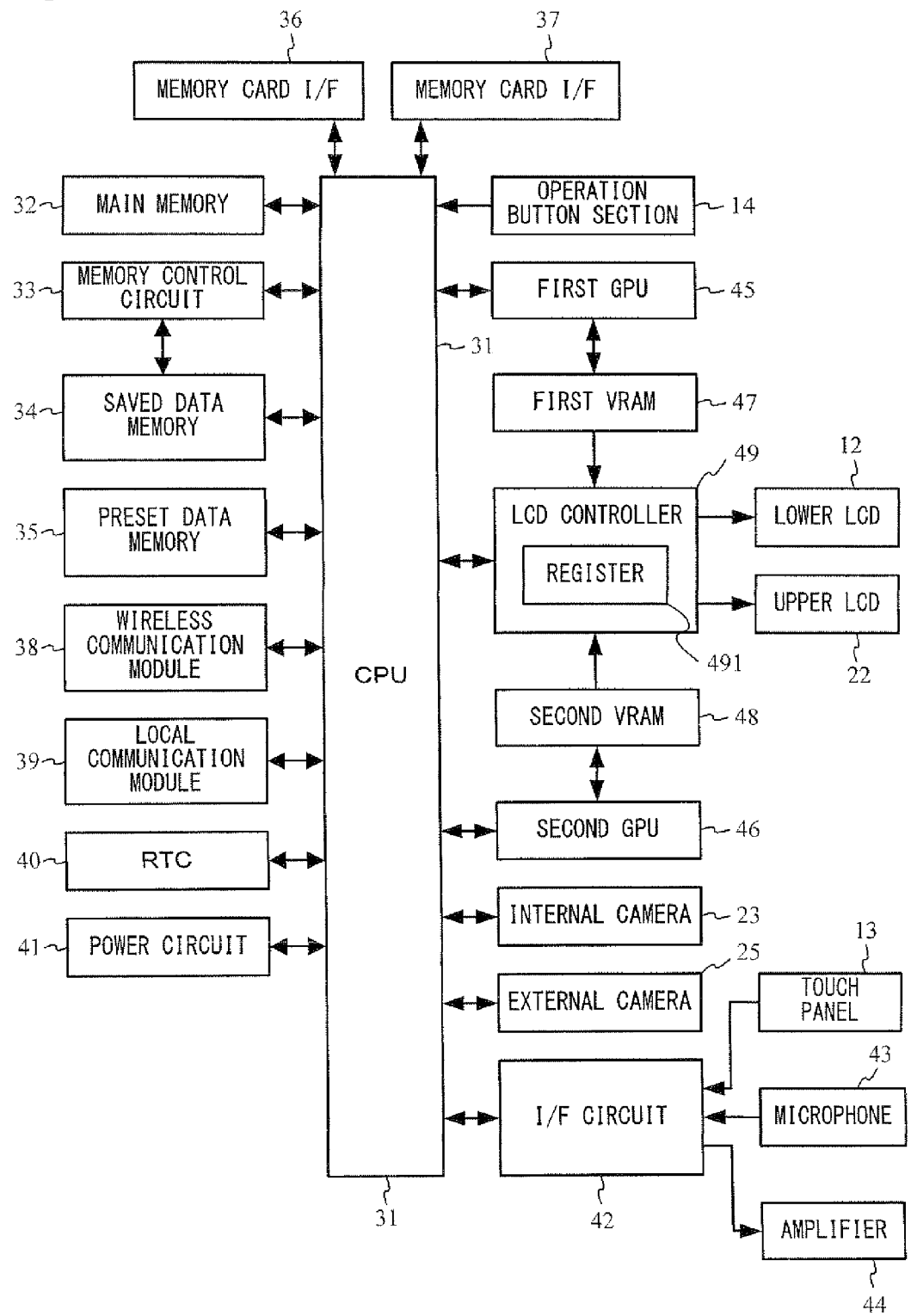
FIG. 2 is a block diagram illustrating an exemplary internal configuration of the game apparatus.

Next, an internal configuration of the game apparatus 1 will be described with reference to FIG. 2. FIG. 2 is a block diagram illustrating an exemplary internal configuration of the game apparatus 1.

In FIG. 2, the game apparatus 1 includes electronic parts, such as a CPU 31, a main memory 32, a memory control circuit 33, a saved data memory 34, a preset data memory 35, a memory card interface (memory card I/F) 36, a memory card I/F 37, a wireless communication module 38, a local communication module 39, a real time clock (RTC) 40, a power circuit 41, an interface circuit (I/F circuit) 42, a first GPU (Graphics Processing Unit) 45, a second GPU 46, a first VRAM (Video RAM) 47, a second VRAM 48, and an LCD controller 49. These electronic parts are mounted on an electronic circuit board, and accommodated within the lower housing 11 (or may be accommodated within the upper housing 21)

The CPU 31 is an information processing means for executing a predetermined program (here, a game program according to the present embodiment). In the present embodiment, the game program is stored in a memory (e.g., saved data memory 34) within the game apparatus 1 as well as in the memory card 28 and/or 29, and the CPU 31 executes the game program, thereby executing a game process to be described later. Note that the program to be executed by the CPU 31 may be prestored in the memory within the game apparatus 1 or may be acquired from the memory card 28 and/or 29 or from other equipment through communication therewith.

The CPU 31 is connected to the main memory 32, the memory control circuit 33, and the preset data memory 35. The memory control circuit 33 is connected to the saved data memory 34. The main memory 32 is a storage means used as a working area or buffering area for the CPU 31. Specifically, the main memory 32 stores various data to be used in the game process, and programs acquired from outside (e.g., the memory cards 28 and 29 and other equipment). In the present embodiment, for example, a PSRAM (Pseudo-SRAM) is used as the main memory 32. The saved data memory 34 is a storage means for storing, for example, the programs to be executed by the CPU 31 and data for images taken by the internal camera 23 and the external camera 25. The saved data memory 34 is configured by a nonvolatile storage medium, e.g., in the present embodiment, a NAND flash memory. The memory control circuit 33 is a circuit for controlling data reading from/writing to the saved data memory 34 in accordance with an instruction by the CPU 31. The preset data memory 35 is a storage means for storing data (preset data) such as various present parameters for the game apparatus 1. As for the preset data memory 35, a flash memory connected to the CPU 31 via an SPI (Serial Peripheral Interface) bus can be used.

The memory card I/Fs 36 and 37 are each connected to the CPU 31. The memory card I/F 36 reads/writes data from/to the memory card 28 attached to the connector in accordance with an instruction from the CPU 31. Also, the memory card I/F 37 reads/writes data from/to the memory card 29 attached to the connector in accordance with an instruction from the CPU 31. In the present embodiment, image data taken by the internal camera 23 and the external camera 25, as well as image data received from other devices are written into the memory card 28, and image data stored in the memory card 28 is read from the memory card 28 and stored to the saved data memory 34 or transmitted to other devices. In addition, various programs stored in the memory card 29 are read and executed by the CPU 31.

Note that the game program of the present invention may be supplied to a computer system not only via an external storage medium, such as the memory card 29, but also via a wired or wireless communication line. Also, the game program may be pre-recorded to a nonvolatile storage device within the computer system. Note that the information storage medium for storing the game program is not limited to the nonvolatile storage device, and may be a CD-ROM, a DVD, or a similar optical disk storage medium.

The wireless communication module 38 has a function of connecting to a wireless LAN in accordance with a system complying with, for example, the IEEE802.11.b/g standard. Also, the local communication module 39 has a function of wirelessly communicating with similar game apparatuses in accordance with a predetermined communication system. The wireless communication module 38 and the local communication module 39 are connected to the CPU 31. The CPU 31 is capable of transmitting/receiving data to/from other equipment via the Internet using the wireless communication module 38, as well as transmitting/receiving data to/from other similar game apparatuses via the Internet using the local communication module 39.

The CPU 31 is also connected to the RTC 40 and the power circuit 41. The RTC 40 counts time and provides an output to the CPU 31. For example, the CPU 31 can calculate the current time (date) based on the time counted by the RTC 40. The power circuit 41 controls power supplied from the power supply (typically, a battery accommodated in the lower housing 11) provided in the game apparatus 1, and supplies power to various parts of the game apparatus 1.

The game apparatus 1 is also provided with the microphone 43 and an amplifier 44. The microphone 43 and the amplifier 44 are each connected to the I/F circuit 42. The microphone 43 senses the voice of the user speaking to the game apparatus 1, and outputs an audio signal representing the voice to the I/F circuit 42. The amplifier 44 amplifies the audio signal from the I/F circuit 42 to provide an output from the speaker (not shown). The I/F circuit 42 is connected to the CPU 31.

Also, the touch panel 13 is connected to the I/F circuit 42. The I/F circuit 42 includes an audio control circuit for controlling the microphone 43 and the amplifier 44 (speaker), and a touch panel control circuit for controlling the touch panel 13. The audio control circuit performs A/D conversion and D/A conversion on the audio signal, and also converts the audio signal into audio data of a predetermined format. The touch panel control circuit generates touch point data (detection coordinate data to be described later) of a predetermined format based on a signal from the touch panel 13, and outputs the generated data to the CPU 31. The touch point data is data representing coordinates of a point at which the touch panel 13 detected an input made to the input screen of the touch panel 13. Note that the touch panel control circuit performs reading of a signal from the touch panel 13 and generation of touch point data once every predetermined period of time.

The above-described operation buttons 14A to 14K constitute an operation button section 14 connected to the CPU 31. The operation button section 14 outputs to the CPU 31 operation data representing the status of input to the operation buttons 14A to 14K (whether or not the buttons have been pressed). The CPU 31 acquires the operation data from the operation button section 14, and executes a process in accordance with an input to the operation button section 14.

The internal camera 23 and the external camera 25 are each connected to the CPU 31. The internal camera 23 and the external camera 25 each take an image in accordance with an instruction from the CPU 31, and output data for the taken image to the CPU 31. In the present embodiment, the CPU 31 instructs either the internal camera 23 or the external camera 25 to perform imaging, and the camera instructed to perform imaging takes an image and transmits image data to the CPU 31.

The first GPU 45 is connected to the first VRAM 47, and the second GPU 46 is connected to the second VRAM 48. In accordance with an instruction from the CPU 31, the first GPU 45 generates a first display image based on display image generation data stored in the main memory 32, and creates an image on the first VRAM 47. In accordance with an instruction from the CPU 31, the second GPU 46 generates a second display image, and creates an image on the second VRAM 48, as in the case of the first GPU 45. The first VRAM and the second VRAM 48 are connected to the LCD controller 49.

The LCD controller 99 includes a register 491. The register 491 stores the value of 0 or 1 in accordance with an instruction from the CPU 31. When the value in the register 491 is 0, the LCD controller 49 outputs the first display image created on the first VRAM 47 to the lower LCD 12, and also outputs the second display image created on the second VRAM 48 to the upper LCD 22. Alternatively, when the value in the register 491 is 1, the LCD controller 49 outputs the first display image created on the first VRAM 47 to the upper LCD 22, and also outputs the second display image created on the second VRAM 48 to the lower LCD 12. For example, the CPU 31 is capable of causing the lower LCD 12 to display an image acquired from either the internal camera 23 or the external camera 25, while causing the upper LCD 22 to display an operation instruction screen generated by a predetermined process.

[Outline of the Coordinate Calculation Process]

Figure 3:
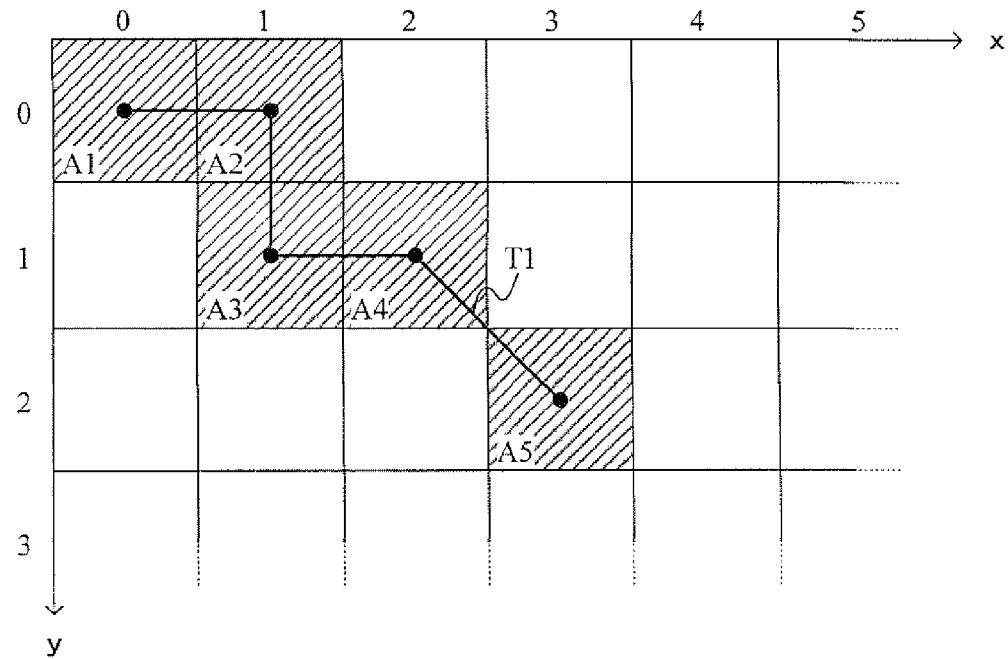
FIG. 3 is a diagram illustrating a coordinate system set for an input screen of a touch panel 13.
Figure 4:
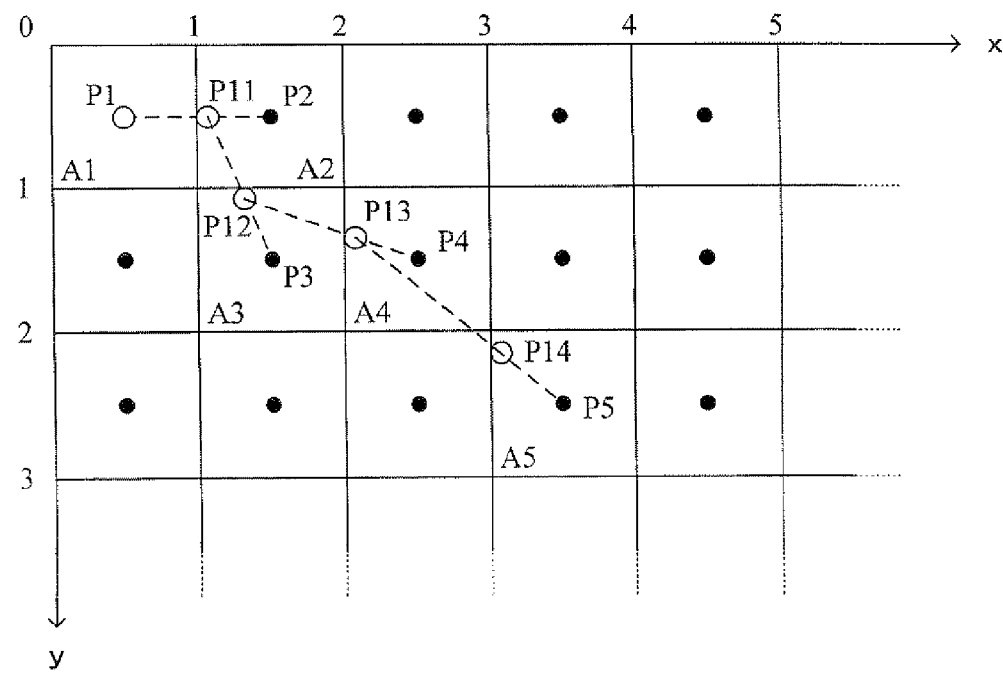
FIG. 4 is a diagram illustrating a detailed coordinate calculation method in the embodiment.
Figure 5:
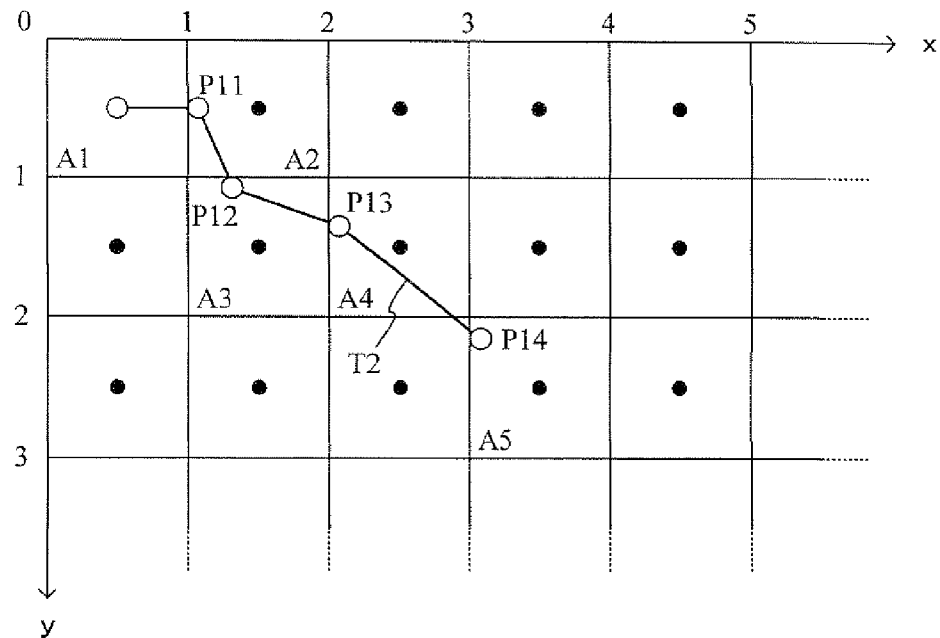
FIG. 5 is a diagram illustrating a trajectory connecting detailed points where inputs are made as shown in FIG. 3.

Next, a game process (coordinate calculation process) to be executed by the game program according to the present embodiment will be outlined with reference to FIGS. 3 to 5. In the present game process, the game apparatus 1 calculates a point (input point) at which an input was made to the touch panel 13 such that the point is represented by values in more detail than with the detection accuracy of the touch panel 13. For example, in the case where coordinate values outputted by the touch panel 13 to indicate the input point are representations using integers, such as "(1,1)" or "(2,3)", the game apparatus 1 calculates an input point to be represented by coordinate values including decimal fractions, such as "(1.3,1.5)" or "(2.5,3.7)". In this manner, the present embodiment is intended to calculate an input point with more detailed accuracy than the detection accuracy of the touch panel 13. Note that the "input point" as used herein broadly refers to a point at which an input was made to the touch panel 13, and is not restricted by the detection or calculation method.

FIG. 3 is a diagram illustrating a coordinate system set for the input screen of the touch panel 13. As shown in FIG. 3, an x-y coordinate system with the origin at the upper left corner is set for the input screen. The touch panel 13 detects a point on the input screen at which an input was made, and outputs coordinates (referred to as "detection coordinates") indicating that point.

In the present embodiment, while the detection coordinates represent a point detected by the touch panel 13, numerical values after the decimal point are not used for representing the point, and therefore the point is represented using integer values. In this manner, the detection coordinates are represented by discrete numerical values, and therefore it can be said that the touch panel 13 outputs coordinates for locating an area of the input screen in which an input was made. Specifically, the input screen is divided into a plurality of unit areas arranged in a matrix, and when an input is made in any one of the unit areas, the touch panel 13 outputs as detection coordinates the coordinates for locating the unit area in which the input was made. Hereinafter, a detected unit area in which the input was made is referred to as a "detection area". That is, the detection coordinates are coordinates (coordinate values) for locating a detection area. Note that in FIG. 3, unit areas marked with diagonal lines represent areas in which an input was made. In FIG. 3, an input is sequentially detected in the order: areas A1, A2, A3, A4, and A5, with the result that the touch panel 13 sequentially outputs detection coordinates represented by (0, 0), (1, 0), (1, 1), (2, 1), and (3,2).

In FIG. 3, in the case where the game apparatus 1 uses the detection coordinates as inputs without modification, the points are represented with low accuracy, resulting in an unsmooth input trajectory (a broken line connecting detection coordinates) such as trajectory Ti connecting detection coordinates. Accordingly, when the detection coordinates are used as inputs without modification, the game apparatus 1 is not able to recognize input points with finer accuracy than the detection accuracy of the touch panel 13, failing to recognize the input points in detail. Therefore, in the present embodiment, the game apparatus 1 calculates detailed coordinates by which input points can be represented in more detail than detection coordinates and performs a process using the detailed coordinates as input points. As a result, it is possible to recognize the input points with more detailed accuracy. A detailed coordinate calculation method will be described below.

FIG. 4 is a diagram illustrating a detailed coordinate calculation method in the present embodiment Note that in FIG. 4, black dots denote the centers of unit areas, and white dots denote detailed points (points indicated by detailed coordinates). When the user (player) successively makes inputs to the touch panel 13, so that detection coordinates are successively acquired from the touch panel 13, the game apparatus 1 calculates detailed coordinates in the following manner.

The detailed coordinates represent a point on the input screen with more detailed accuracy than the detection coordinates. In the present embodiment, the detection coordinates indicate an input point using integer values, whereas the detailed coordinates indicate an input point using numerical values after the decimal point (specifically, to the first decimal place).

In the present embodiment, the detailed coordinates are represented by numerical values such that peripheral (border) points of the unit areas arranged in a matrix as shown in FIG. 4 are represented using integers. Specifically, in FIG. 4, each unit area is represented by "($m \leq x < m+1$, $n \leq y < n+1$) (where m and n are integers of 0 or more)". The reason why the method shown in FIG. 4 is used to represent detailed coordinates in the present embodiment is that the original detection coordinates can be readily calculated from detailed coordinates (the details will be described later). The method for representing the detailed coordinates is not limited to the method shown in FIG. 4, and any method can be employed so long as the detailed coordinates are represented with more detailed accuracy than in the case where the detection coordinates are used. For example, in another embodiment, each unit area may be represented by "($m-0.5 \leq x < m+0.5$, $n-0.5 \leq y < n+0.5$)".

A detailed coordinate calculation method will be described below. When the first detection coordinates are acquired, the game apparatus 1 calculates detailed coordinates indicating the center of a detection area indicated by the detection coordinates. In the example shown in FIG. 4, upon acquisition of the first detection coordinates (0,0), the game apparatus 1 calculates the detailed coordinates (0.5, 0.5) indicating the center (point P1) of detection area A1.

Next, upon acquisition of the second of the detection coordinates to be successively acquired or any subsequent detection coordinates, the game apparatus 1 calculates detailed coordinates indicating a point in the direction of the previous detection area, as viewed from the center of the current detection area. Note that the current detection area refers to a detection area indicated by the currently acquired detection coordinates, and the previous detection area refers to a detection area indicated by the previously acquired detection coordinates. In the example of FIG. 4, upon acquisition of the detection coordinates indicating detection area A2, the game apparatus 1 calculates as detailed coordinates the coordinates indicating a point (point P11) in the direction of the previous detection area A1, as viewed from the center (point P2) of the current detection area A2. In this manner, by using as a detailed point a point in the direction of the previous detection area, as viewed from the center of the current detection area, it becomes possible to form a smooth input trajectory connecting detailed points.

Note that in the present embodiment, the game apparatus 1 calculates a detailed point based on the previously calculated detailed point and the center of the current detection area. Specifically, the current detailed point is calculated so as to be located on a line connecting the previously calculated detailed point and the center of the current detection area but not to be located at either end of the line. More specifically, the current detailed point is located on the line and inscribed in the current detection area. In the exempla shown in FIG. 4, upon acquisition of the detection coordinates indicating detection area A2, the current detailed point corresponds to the position of point P11 located on the line connecting points P2 and P1 and inscribed in detection area A2. Similarly, upon acquisition of the detection coordinates indicating detection area A3, the current detailed point corresponds to the position of point P12 located on the line connecting points P11 and P3 and inscribed in detection area A3. Also, upon acquisition of the detection coordinates indicating detection area A4, the current detailed point corresponds to the position of point P13 located on the line connecting points P12 and P4 and inscribed in detection area A4. Furthermore, upon acquisition of the detection coordinates indicating detection area A5, the current detailed point corresponds to the position of point P14 located on the line connecting points P13 and P5 and inscribed in detection area A5.

FIG. 5 is a diagram illustrating a trajectory connecting detailed points where inputs are made as shown in FIG. 3. It can be appreciated from FIG. 5 that trajectory T2 connecting detailed points P1 to P14 is smoother than trajectory T1 connecting detection coordinate points (FIG. 3).

As described above, in the present embodiment, the game apparatus 1 can calculate input points with more detailed accuracy than the detection accuracy of the touch panel 13. Also, the trajectory connecting the calculated input points (detailed coordinate points) is smoother than the trajectory connecting detection coordinate points. Such a smooth trajectory is close to a trajectory actually inputted by the user, and therefore the game apparatus 1 can calculate the input points with higher precision. Also, in the present embodiment, upon acquisition of each set of detection coordinates, a detailed point (detailed coordinates) corresponding to the detection coordinates is calculated, and therefore the game apparatus 1 can calculate the detailed point in real-time, thereby calculating the input point in real-time.

Figure 6:
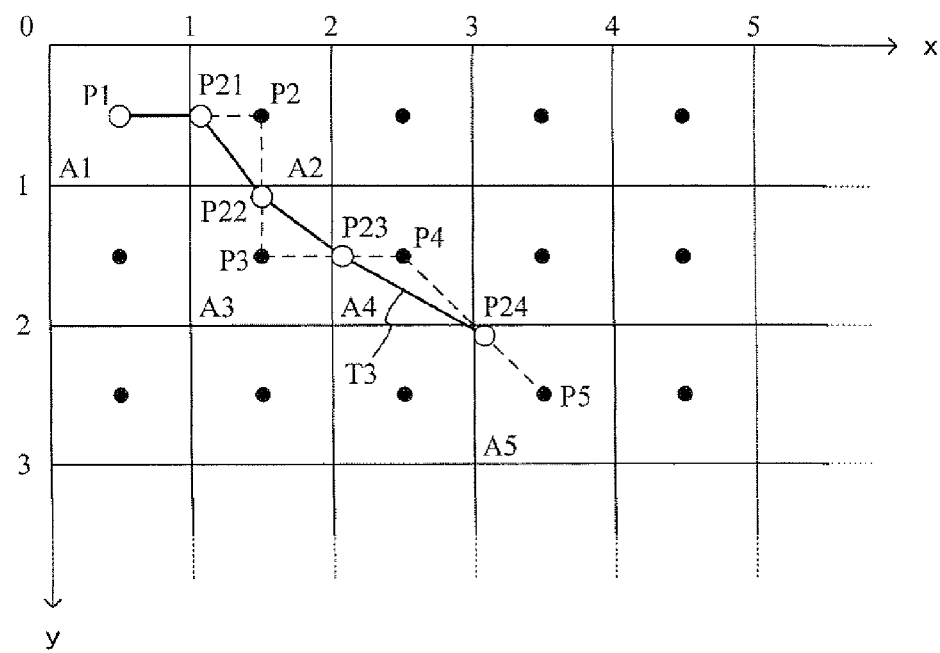
FIG. 6 is a diagram illustrating a detailed coordinate calculation method in another embodiment.

Also, in the present embodiment, the game apparatus 1 calculates the current detailed point based on the previously calculated detailed point and the center of the current detection area. Note that in another embodiment, the detailed point may be calculated based on the center of the previous detection area and the center of the current detection area. FIG. 6 is a diagram illustrating a detailed coordinate calculation method in another embodiment. In FIG. 6, the detailed point to be calculated upon acquisition of the detection coordinates indicating detection area A2 corresponds to the point (point P21) located on the line connecting the center (point P1) of the previous detection area A1 and the center (point P2) of the current detection area A2 (more specifically, the point inscribed in detection area A2). Similarly, in the case where the detection coordinates indicating detection area A3 are acquired, the detailed point corresponds to the position of point P22 located on the line connecting points P2 and P3 and inscribed in detection area A3. Also, in the case where the detection coordinates indicating detection area A4 are acquired, the detailed point corresponds to the position of point P23 located on the line connecting points P3 and P4 and inscribed in detection area A4. Furthermore, in the case where the detection coordinates indicating detection area A5 are acquired, the detailed point corresponds to the position of point P24 located on the line connecting points P4 and P5 and inscribed in detection area A5. In this manner, in some embodiments, the detailed point may be calculated as a point on a line connecting the center of the previous detection area and the center of the current detection area. As shown in FIG. 6, trajectory T3 connecting detailed points P1 to 224 is smoother than trajectory T1 connecting detection coordinate points (FIG. 3), and therefore it is appreciated that the method shown in FIG. 6 can achieve effects similar to those achieved by the embodiment as described earlier.

Also, the game apparatus 1 preferably sets the detailed point to be located on the line within the current detection area (see FIGS. 4 and 6). When the detailed point is located within the current detection area, the area being currently touched by the user matches a detailed point calculated as an input, and therefore it is possible to prevent the user from feeling unnatural and also to calculate detailed points with precision. Furthermore, the detailed point is preferably a point located on the line and inscribed in the current detection area. The closer the detailed point is to the previous detection area, the smoother the trajectory connecting detailed points is.

Figure 7:
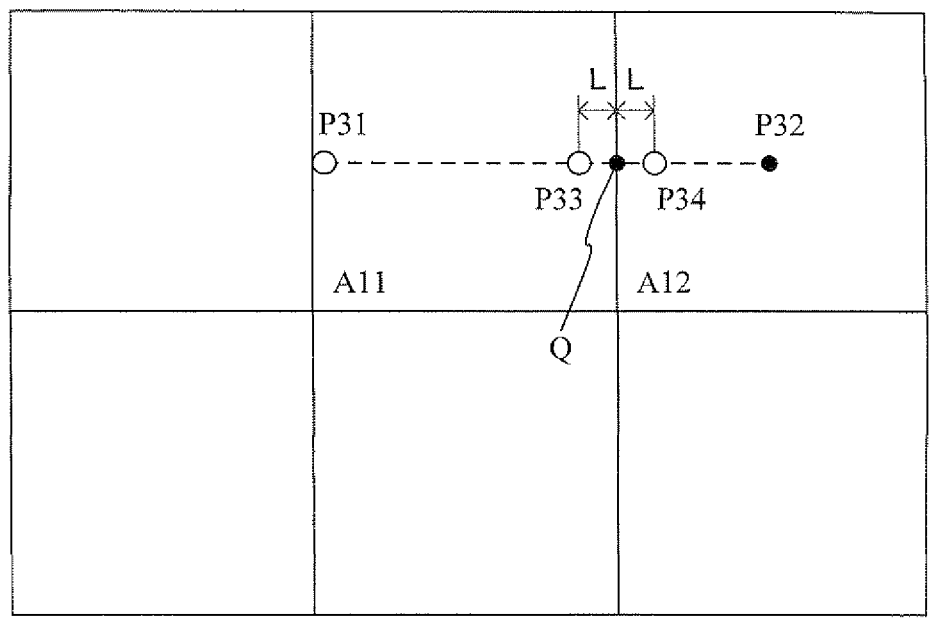
FIG. 7 is a diagram illustrating a detailed coordinate calculation method in another embodiment.

While the detailed point in the present embodiment is calculated as a point inscribed in the current detection area, in another embodiment, the detailed point may be calculated as a point located close to the border between the previous detection area and the current detection area. Specifically, the detailed point may be calculated as a point located on the line within a predetermined distance from the intersection between the periphery of the current detection area and the line. FIG. 7 is a diagram illustrating a detailed coordinate calculation method in another embodiment. In FIG. 7, area A11 is the previous detection area, and point P31 represents the previously calculated detailed point. Also, area A12 is the current detection area, and point P32 represents the center of the current detection area A12. Point Q is the intersection between the line connecting points P31 and P32 and the periphery of the current detection area A12. Here, the detailed point may be calculated as a point located within a predetermined distance L from the intersection Q, as shown in FIG. 7; specifically, the point is located on the line connecting points P33 and P34. As shown in FIG. 7, even when the detailed point is close to the border between the previous detection area and the current detection area, the trajectory connecting detailed points is smoother than trajectory T1 connecting detection coordinates, and therefore effects similar to those achieved by the present embodiment can be achieved.

In the calculation method shown in FIG. 7, the detailed point is located within a predetermined distance from the periphery of the current detection area, but the detailed point may be located within a predetermined distance from the center of the current detection area. Specifically, the point within a predetermined distance is located at, for example, the predetermined distance.

Note that in the case where the detailed point is close to the previously calculated detailed point (point P31), the currently calculated detailed point is located away from the current detection area. In such a case, there is a large gap between the area in which the user is actually making an input and the calculated detailed point, and therefore the detailed point cannot be calculated with precision. Also, in this case, the currently calculated detailed point is within the previous detection area, and therefore from another perspective, it can be said that the currently calculated detailed point corresponds to the previous detection area, and the detailed point is processed after a delay corresponding to a single processing operation compared to the detection area. On the other hand, in the case where the detailed point is located close to the center (point P32) of the current detection area, the trajectory connecting detailed points approaches trajectory T1 connecting detection coordinate points, so that the game apparatus 1 fails to obtain a smooth trajectory. Accordingly, there is a problem in the case where the detailed point is located too close to either the previously calculated detailed point or the center of the current detection area. Therefore, the detailed point is preferably calculated as a point close to the border as described in the present embodiment or as shown in FIG. 7.

[Details of the Game Process]

Figure 8:
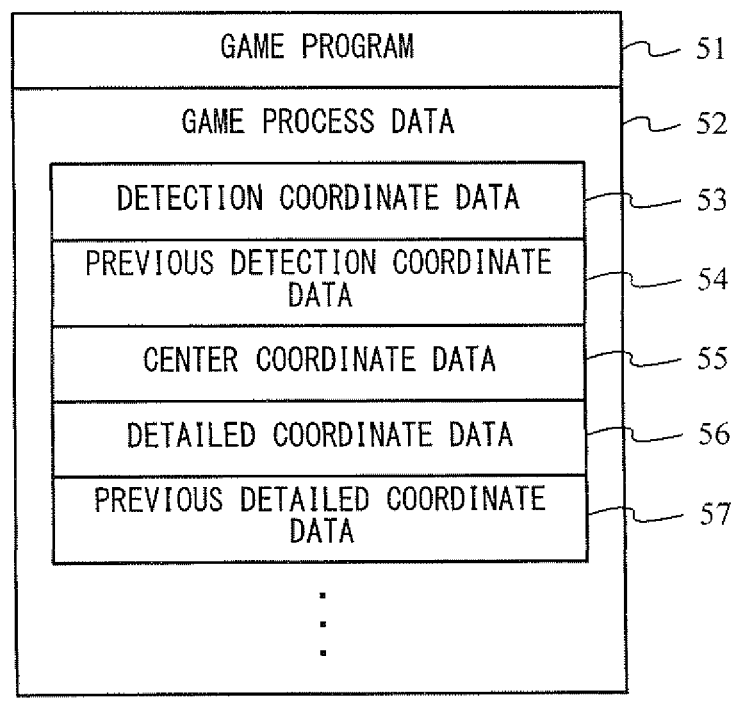
FIG. 8 is a diagram illustrating data stored in a main memory 32 of a game apparatus 1.

Hereinafter, the game process to be executed by the game program according to the present embodiment will be described in detail with reference to FIGS. 8 to 10. First, various types of data to be used in the game process will be described. FIG. 8 is a diagram illustrating data stored in the main memory 32 of the game apparatus 1. In FIG. 8, the main memory 32 has stored therein a game program 51 and game process data 52 according to the present embodiment.

The game program 51 is a program for causing the CPU 31 of the game apparatus 1 to execute a game process (FIG. 9) to be described later. The game program 51 may be stored to the main memory 32 by being read from the memory card 29 at a suitable time or being acquired via communication with any device external to the game apparatus 1.

The game process data 52 is data to be used in the game process (FIG. 9) to be described later. The game process data 52 includes detection coordinate data 53, previous detection coordinate data 54, center coordinate data 55, detailed coordinate data 56, and previous detailed coordinate data 57. Note that the game process data 52 includes, in addition to data shown in FIG. 9, data required for the game process, such as image data for various objects and icons appearing in the game, and data indicating parameters set for the objects.

The detection coordinate data 53 is data indicating detection coordinates. Specifically, the detection coordinate data 53 is data acquired from the touch panel 13 as touch point data. When the user made an input to the touch panel 13, the detection coordinate data 53 indicates coordinates for a detection area. On the other hand, before the user makes an input to the touch panel 13, the detection coordinate data 53 indicates that no input has been made.

The previous detection coordinate data 54 is detection coordinate data previously acquired from the touch panel 13. Specifically, when new detection coordinate data is acquired from the touch panel 13, old detection coordinate data 53 remains in the main memory 32 as previous detection coordinate data 54. The previous detection coordinate data 54 is used in, for example, a detailed coordinate calculation process.

The center coordinate data 55 is data indicating coordinates (center coordinates) of the center of a detection area. As will be described in detail, in the present embodiment, detection coordinates outputted from the touch panel 13 do not indicate the center of a unit area, and therefore the CPU 31 calculates the center coordinates from the detection coordinates.

The detailed coordinate data 56 is data indicating detailed coordinates. In the present embodiment, the x- and y-elements of a detection coordinate value are represented by integer values, and the elements of a detailed coordinate value are represented by numerical values to the first decimal place.

The previous detailed coordinate data 57 is previously calculated detailed coordinate data. Specifically, when new detailed coordinate data is calculated, old detailed coordinate data 56 remains in the main memory 32 as previous detailed coordinate data 57. The previous detailed coordinate data 57 is used for calculating the current detailed coordinates when the current detection area is the same as the previously detection area.

Next, the game process to be executed by the game apparatus 1 will be described in detail with reference to FIGS. 9 and 10. FIG. 9 is a main flowchart illustrating the flow of the game process to be executed by the game apparatus 1. When the power button 14F is pressed to turn ON the game apparatus 1, the CPU 31 of the game apparatus 1 initializes the main memory 32 and other elements, and thereafter starts executing the game program 51 for performing the game process shown in FIG. 9. In the present embodiment, by executing the game program 51, the CPU 31 is caused to function as described in the accompanying claims. That is, the game program 51 causes the CPU 31 to function as described in the accompanying claims.

First, in step S1, the CPU 31 performs an initialization process. For example, the CPU 31 constructs a virtual game space, and places each object appearing in the game space in an initialization position. Furthermore, the CPU 31 sets initialization values for various parameters and flags to be used in the game process. As for the data items 53 to 57 included in the game process data 52, no initialization value is set in the main memory 32, i.e., data for their initialization values is not stored in the main memory 32. Following step S1, the process of step S2 is executed. Thereafter, a process loop of steps S2 to S6 is executed once every predetermined time period (e.g., 1/60 sec.).

In step S2, the CPU 31 determines whether or not any input has been made to the touch panel 13. Specifically, the CPU 31 acquires touch point data from the touch panel 13, and determines whether the touch point data indicates detection coordinates or indicates that no input has been made to the touch panel 13. When the determination result in step S2 is affirmative, the process of step S3 is executed. On the other hand, when the determination result in step S2 is negative, the processes of steps S3 and S4 are skipped, and the process of step S5 to be described later is executed. Note that when the determination result in step S2 is negative, the CPU 31 deletes the previous detection coordinate data 54 stored in the main memory 32.

In step S3, the CPU 31 acquires detection coordinates. Specifically, the CPU 31 stores the touch point data acquired from the touch panel 13 in step S2 to the main memory 32 as detection coordinate data 53. Also, the detection coordinate data 53 stored to the main memory 32 prior to step S3 remains in the main memory 32 as previous detection coordinate data 54. Following step S3, the process of step S4 is executed.

In step S4, the CPU 31 executes a detailed coordinate calculation process. The detailed coordinate calculation process is a process for calculating detailed coordinates from detection coordinates. The detailed coordinate calculation process will be described in detail below with reference to FIG. 10.

Figure 9:
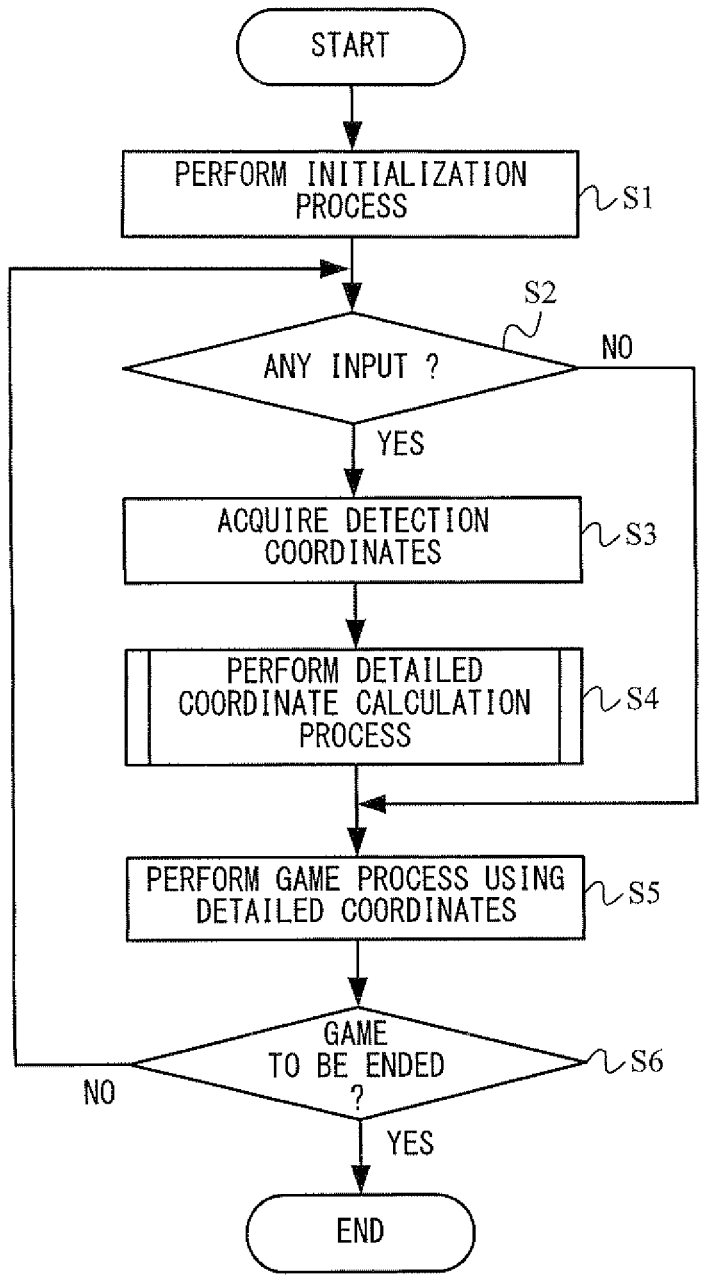
FIG. 9 is a main flowchart illustrating the flow of a game process to be executed by the game apparatus 1.
Figure 10:
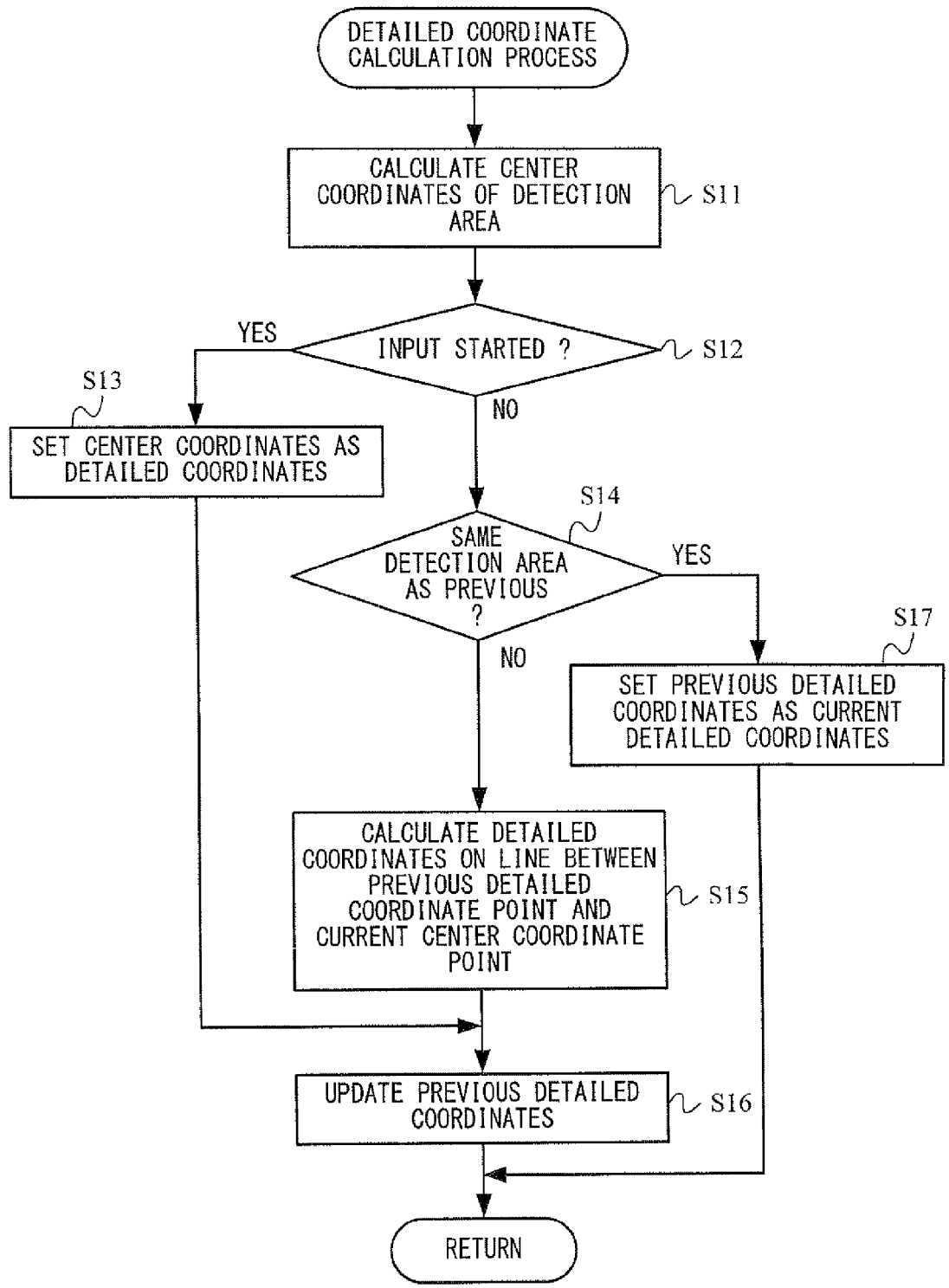
FIG. 10 is a flowchart illustrating the flow of a detailed coordinate calculation process (step S4) shown in FIG. 9.

FIG. 10 is a flowchart illustrating the flow of the detailed coordinate calculation process (step S4) shown in FIG. 9. In the detailed coordinate calculation process, first, in step S11, the CPU 31 calculates center coordinates indicating the center of a detection area indicated by the detection coordinates acquired in step S3. Here, in the present embodiment, the detailed coordinates are represented by numerical values such that peripheral (border) points of the unit areas arranged in a matrix are represented by integers. Therefore, the center is represented by (m+0.5, n+0.5). Accordingly, the center of the detection area can be calculated as described below using the detection coordinates. Specifically, the CPU 31 reads the detection coordinate data 53 from the main memory 32. Then, the CPU 31 calculates the center coordinates (NX, NY) in accordance with equation (1) below based on the detection coordinates (IX, IY) indicated by the detection coordinate data 53.

$$NX=\{IX+(IX+1)\}/2$$

$$NY=\{IY+(IY+1)\}/2 \quad (1)$$

Equation (1) represents the center coordinates being obtained by adding 0.5 to each of the x- and y-elements of the detection coordinate value. Data indicating the center coordinates calculated by equation (1) is stored to the main memory 32 as center coordinate data 55. Following step S11, the process of step S12 is executed.

According to the process of step S11, the detection area represented by the detection coordinates (m, n) corresponds to the area "(m≤x<m+1, n≤y<n+1)" in the coordinate system for detailed coordinates. In this case, points in a given unit area that can be represented by detailed coordinates have an integer portion in common. That is, detailed coordinates having an integer portion in common are included in the same unit area. Accordingly, by dropping the fractional portions of detailed coordinates, the original detection coordinates can be readily calculated. In this manner, in the present embodiment, the game apparatus 1 calculates center coordinates in accordance with equation (1) in order to facilitate calculation of the original detection coordinates from the detailed coordinates. Accordingly, in the present embodiment, it is possible to readily deal with both cases where the detailed coordinates or the detection coordinates are used in the game process as inputs. Note that the process of step S11 is not indispensable for the present invention, and therefore, for example, the CPU 31 may consider the detection coordinates (m, n) as the center of the detection area indicated by the detection coordinates (m, n), without executing the process of step S11. In this case, the unit area is represented by "(m−0.5≤x<m+0.5, n−0.5≤y<n+0. 5)" Here, in the case where the original detection coordinates are calculated from the detailed coordinates, the detailed coordinates may be rounded to the nearest whole number.

Also, in some cases, the detailed coordinates cannot represent the center of the unit area depending on the accuracy of numerical values that can represent the detailed coordinates. For example, in the present embodiment, assuming that the detailed coordinates can be represented only by a numerical value "n+0.2x (where n and x are integers)", the center (n+0.5) of the unit area cannot be represented. In such a case, the CPU 31 simply calculates a point (e.g., "n+0.4" or "n+0.6") corresponding to the center of the unit area in step S11.

In step S12, the CPU 31 determines whether or not the input to the touch panel 13 has been just started. The determination of step S12 is made based on whether or not the previous detection coordinate data 54 is stored in the main memory 32. The process of step S12 is a process for determining whether the current detection area indicated by the detection coordinates acquired in step S2 is the starting point of an input trajectory. When the determination result of step S12 is affirmative, the process of step S13 is executed. On the other hand, when the determination result of step S12 is negative, the process of step S14 to be described later is executed.

In step S13, the CPU 31 sets the center coordinates of the current detection area as detailed coordinates. Specifically, the same values as the center coordinates calculated in step S11 are set as detailed coordinates. More specifically, the CPU 31 stores the contents of the center coordinate data 55 to the main memory 32 as detailed coordinate data 56. Following step S11, the process of step S16 to be described later is executed.

In the present embodiment, when the touch input is started, the center coordinates of the detection area are calculated as detailed coordinates, as in step S13. That is, the detailed point at the start of the touch input is the center of the detection area (see, for example, point P1 in FIG. 4).

On the other hand, in step S14, the CPU 31 determines whether the current detection area is the same as the previous detection area. Specifically, the CPU 31 reads the detection coordinate data 53 and the previous detection coordinate data 54 from the main memory 32, and determines whether or not the detection coordinates indicated by the detection coordinate data 53 are the same as the detection coordinates indicated by the previous detection coordinate data 54. When the determination result of step S14 is affirmative, the process of step S17 to be described later is executed. On the other hand, when the determination result of step S14 is negative, the process of step 315 is executed.

Here, in some cases, the user making an input to the touch panel 13 might not move the touch point on the input screen for reasons such as making the input with precision. The calculation process of step S15 to be described later is based on the premise that the current detection area differs from the previous detection area, and therefore the calculation cannot be executed when the two areas are the same, as in the case where the user touches the input screen but does not move the touch point. The process of step S14 is a process for preventing erroneous process execution under such a situation.

In step S15, the CPU 31 calculates detailed coordinates based on the previous detailed coordinates and the current center coordinates. The detailed coordinates are calculated to represent a point located on a line connecting the previous detailed coordinates and the current center coordinates and inscribed in the current detection area. The detailed coordinate calculation method will be described in detail below.

First, a line (straight line) connecting the previous detailed coordinates (OX, OY) and the current center coordinates (NX, NY) is represented by equation (2) below.

$$y-OY=\{(OY-NY)/(OX-NX)\}(x-OX) \qquad (2)$$

The detailed coordinates to be calculated correspond to a point located on the straight line and inscribed in the current detection area. Here, the detailed coordinates are represented by discrete numerical values, and therefore the "point inscribed in the detection area" is a point that is located within the detection area and has the maximum or minimum x-/y-coordinate value among all points that can be represented by detailed coordinates (all values that can be represented as detailed coordinates). Specifically, there are the following four points that are inscribed in the detection area and can be represented by "(m≤x<m+1, n≤y<n+1)":

(a) a point with the x-element "m" (inscribed in the detection area at the left periphery);
(b) a point with the x-element "m+0.9" (inscribed in the detection area at the right periphery);
(c) a point with the y-element "n" (inscribed in the detection area at the top periphery); and
(d) a point with the y-element "n+0.9" (inscribed in the detection area at the bottom periphery).

Accordingly, by identifying the periphery of the current detection area at which the detailed coordinate point is inscribed in the current detection area, the x- or y-element of the detailed coordinate value can be calculated. Furthermore, when one of the x- and y-elements of the detailed coordinates is known, the other element can be calculated in accordance with equation (2). Note that in the present embodiment, the detailed coordinates are represented by numerical values to the first decimal place, and therefore in (b) and (d) above, the x- and y-elements of detailed coordinates are "m+0.9" and "n+0.9", respectively, but, for example, when the detailed coordinates are represented by numerical values to the second decimal place, the x- and y--elements of detailed coordinates may be "m+0.99" and "n+0.99", respectively, in (b) and (d).

Also, it is possible to know the periphery at which the detailed coordinate point is inscribed in the current detection area based on the positional relationship between the straight line and the current detection area represented by equation (2). Specifically, one of the (four) peripheries of the current detection area that intersects with the straight line represented by equation (2) is the periphery at which the detailed coordinate points is inscribed in the current detection area.

In this manner, when calculating the detailed coordinates, the CPU 31 initially identifies the periphery at which the detailed coordinate points is inscribed in the current detection area, then calculates one of the elements of the detailed coordinate value in accordance with (a) to (d) above depending on the periphery at which the detailed coordinate point is inscribed in the current detection area, and calculates the other element in accordance with equation (2). Specifically, the CPU 31 initially reads the center coordinate data 55 and the previous detailed coordinate data 57, and calculates equation (2). Then, the periphery at which the straight line represented by equation (2) intersects with the current detection area is identified. Next, the CPU 31 reads the detection coordinate data 53, and calculates the detailed coordinates (FX, FY) based on the current detection coordinates (IX, IY), the previous detailed coordinates (OX, OY), and the center coordinates (NX, NY). Specifically, the detailed coordinates are calculated in accordance with equations (3) to (6) below depending on the periphery at which the straight line represented by equation (2) intersects with the current detection area:

in the case where the straight line represented by equation (2) intersects with the left periphery of the detection area, $$FX=IX$$

$$FY=\{(OY-NY)/(OX-NX)\}(IX-OX)+OY \qquad (3);$$

in the case where the straight line represented by equation (2) intersects with the right periphery of the detection area, $$FX=IX+0.9$$

$$FY=\{(OY-NY)/(OX-NX)\}(IX+0.9-OX)+OY \qquad (4);$$

in the case where the straight line represented by equation (2) intersects with the top periphery of the detection area, $$FX=\{(OX-NX)/(OY-NY)\}(IY-OY)+OX$$

$$FY=IY \qquad (5);$$

and in the case where the straight line represented by equation (2) intersects with the bottom periphery of the detection area, $$FX=\{(OX-NX)/(OY-NY)\}(IY+0.9-OY)+OX$$

$$FY=IY+0.9 \qquad (6).$$

Data indicating the detailed coordinates calculated by equations (3) to (6) is stored to the main memory 32 as detailed coordinate data 56. Following step S15, the process of step S16 is executed.

In step S16, the CPU 31 updates the previous detailed coordinates. Specifically, the contents of the detailed coordinate data 56 stored in the main memory 32 are stored to the main memory 32 as previous detailed coordinate data 57. After step S16, the CPU 31 ends the detailed coordinate calculation process.

On the other hand, in step S17, the CPU 31 sets the current detailed coordinates to be the same as the previous detailed coordinates. Specifically, the CPU 31 stores the contents of the previous detailed coordinate data 57 stored in the main memory 32 to remain in the main memory 32 as detailed coordinate data 56. As a result, the same values as the previous detailed coordinates are calculated as the current detailed coordinates. Upon completion of step S17, the CPU 31 ends the detailed coordinate calculation process.

According to the detailed coordinate calculation process, when the detection coordinates are acquired from the touch panel 13, a point located on a line connecting the previous detailed coordinate point and the center coordinate point of the current detection area and inscribed in the current detection area is calculated as a detailed coordinate point (step S15). Accordingly, it is possible to calculate the user's input points with more detailed accuracy than the detection accuracy of the touch panel 13 (detection coordinates). Also, according to the detailed coordinate calculation process, in the case where the starting point of the input trajectory is inputted (Yes in step S12), the detailed coordinates are set to be the center coordinates of the detection area (step S13). Therefore, since the detailed coordinates do not deviate from the center in any direction, it is possible to reduce the difference between the starting point of an input trajectory and a point actually touched by the touch pen 27 or suchlike.

Also, according to the detailed coordinate calculation process, in the case where the previous detection area and the current detection area are the same (Yes in step S14), the same coordinates as the previous detailed coordinates are set as detailed coordinates (step S17). Here, when the previous detection area and the current detection area are the same, the detailed coordinates cannot be calculated by the process of step S15. However, in the detailed coordinate calculation process, the detailed coordinates can be readily and reliably calculated by the process of step S17.

In step S5, the CPU 31 executes the game process using the detailed coordinates. The game process may be any process where detailed coordinates are used as user inputs. The game process may be a process in which objects in the game space are deformed in accordance with, for example, points on the touch panel 13 touched by the user, or may be a process in which the shape of a trajectory drawn on the touch panel 13 by the user is identified, and the player character appearing in the game space is caused to perform an action in accordance with the shape. In the present embodiment, the game apparatus 1 can recognize input points in more detail than can be recognized with the detection accuracy of the touch panel 13, and therefore the game apparatus 1 can calculate trajectories inputted by the user with higher accuracy, and also can recognize the shapes of the trajectories with higher precision. Following step S5, the process of step S6 is executed.

In step S6, the CPU 31 determines whether or not to end the game. The determination of step S6 is made based on, for example, whether or not the game has been cleared, the game is over, or the player has provided an instruction to stop the game. When the determination result of step S6 is negative, the process of step S2 is executed again. After this, the process loop of steps S2 to S16 will be repeatedly executed until it is determined in step S6 that the game is to be ended. On the other hand, when the determination result of step S6 is affirmative, the CPU 31 completes the game process shown in FIG. 9. This concludes the description of the game process.

As described above, according to the present embodiment, the game apparatus 1 calculates detailed coordinates that can represent points in more detail than detection coordinates, making it possible to recognize input points in more detail than with the detection accuracy of the touch panel 13. Furthermore, according to the present embodiment, the game apparatus 1 calculates as a detailed point a point that is located on a line connecting the previous detailed coordinates and the center coordinates of the current detection area and inscribed in the current detection area. By calculating a plurality of detailed points, the game apparatus 1 can obtain the possible closest point to a point at which the user actually made an input. Thus, the game apparatus 1 can calculate a point at which an input was made to the input screen in more detail and with higher precision.

[Other Embodiments]

Note that the above embodiment is merely an example of carrying out the present invention, and the invention can be carried out, for example, with configurations according to other embodiments as described below.

In the above embodiment, the game apparatus 1 has been described by way of example as including the touch panel 13 as an example of the pointing device for detecting points at which inputs were made to the instruction plane (input screen). Here, in another embodiment, the game apparatus 1 may use an input device, such as a mouse or a touch pad, as the pointing device. Also, the present invention is applicable to input systems for remotely specifying on-screen points. For example, such an input system calculates a position on the display screen (instruction plane) that is pointed at by a controller (input device) to be manually operated by the user based on an image taken by a camera included in the controller and/or based on, for example, acceleration detected by an acceleration sensor included in the controller.

Also, in the above embodiment, the touch panel 13 has been described as outputting data indicating a single coordinate point (a single unit area) as a detection result. Here, in another embodiment, the touch panel 13 may be a multi-touch-type touch panel which outputs a plurality of coordinate values as detection results when inputs are simultaneously made at a plurality of points on the input screen. In the case where the touch panel 13 is of a multi-touch-type, the game apparatus 1 may select one of the outputted detection coordinate values that satisfies predetermined conditions, and execute similar processes to those in the above embodiment using the selected detection coordinate values. Alternatively, the game apparatus 1 may process each of the outputted detection coordinate values as in the above embodiment.

Also, in the above embodiment, the present invention has been described by way of example as being used in game applications, but the present invention can also be used in applications other than games. For example, in another embodiment, the present invention can be applied to an information processing device executing processes for recognizing characters drawn in the instruction plane or displaying trajectories drawn in instruction plane on the screen.

Thus, the present invention aims to for example, recognize in more detail points at which inputs were made to an instruction plane using a pointing device, and is applicable to, for example, information processing systems such as game apparatuses and game programs.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an information processing program comprising instructions to be executed by a computer in an information processing device capable of acquiring a detection result from a pointing device for detecting input to a predetermined instruction plane, wherein,
the pointing device detects a point in one of a plurality of unit areas at which input was made, the unit areas being arranged in a matrix in the instruction plane,
the information processing program causing the computer to perform:
repeatedly acquiring detection coordinates for locating the unit area detected by the pointing device; and
repeatedly calculating, in response to the acquisition of the detection coordinates by the acquisition, detailed coordinates by which a point in the instruction plane is represented with higher resolution than the detection coordinates provide, and
calculating detailed coordinates indicating a point in the direction of a unit area indicated by previously acquired detection coordinates, as viewed from a predetermined reference point within a unit area indicated by currently acquired detection coordinates.

2. The storage medium according to claim 1, wherein the detailed coordinate calculation calculates detailed coordinates indicating a point in the direction of the unit area indicated by the previously acquired detection coordinates, as viewed from a point corresponding to the center of the unit area indicated by the currently acquired detection coordinates.

3. The storage medium according to claim 2, wherein the detailed coordinate calculation calculates detailed coordinates indicating a point on a line, excluding both ends thereof, the line connecting a point indicated by previously calculated detailed coordinates and the point corresponding to the center of the unit area indicated by the currently acquired detection coordinates.

4. The storage medium according to claim 3, wherein the detailed coordinate calculation calculates detailed coordinates indicating a point on the line within the unit area indicated by the currently acquired detection coordinates.

5. The storage medium according to claim 4, wherein the detailed coordinate calculation calculates detailed coordinates indicating a point located on the line and inscribed in the unit area indicated by the currently acquired detection coordinates.

6. The storage medium according to claim 3, wherein the detailed coordinate calculation calculates detailed coordinates indicating a point located on the line within a predetermined distance from an intersection between the line and a perimeter of the unit area indicated by the currently acquired detection coordinates.

7. The storage medium according to claim 2, wherein the detailed coordinate calculation calculates detailed coordinates indicating a point on a line, excluding both ends thereof, the line connecting a point corresponding to the center of the unit area indicated by the previously acquired detection coordinates and the point corresponding to the center of the unit area indicated by the currently acquired detailed coordinates.

8. The storage medium according to claim 7, wherein the detailed coordinate calculation calculates detailed coordinates indicating a point on the line within the unit area indicated by the currently acquired detection coordinates.

9. The storage medium according to claim 8, wherein the detailed coordinate calculation calculates detailed coordinates indicating a point located on the line and inscribed in the unit area indicated by the currently acquired detection coordinates.

10. The storage medium according to claim 7, wherein the detailed coordinate calculation calculates detailed coordinates indicating a point located on the line within a predetermined distance from an intersection between the line and a perimeter of the unit area indicated by the currently acquired detection coordinates.

11. The storage medium according to claim 1, wherein, the acquisition acquires information as a detection result by the pointing device when no input is made to the instruction plane, the information indicating that no input is made to the instruction plane, and
the detailed coordinate calculation calculates detailed coordinates indicating a predetermined point in the unit area indicated by detection coordinates when the detection coordinates have previously not acquired but currently acquired by the acquisition.

12. The storage medium according to claim 1, wherein the detailed coordinate calculation calculates detailed coordinates indicating the same point as the previously calculated detailed coordinates when the detection coordinates currently acquired by the acquisition are the same as the previously acquired detection coordinates.

13. The storage medium according to claim 1, wherein the detailed coordinate calculation calculates the detailed coordinates such that numerical values that can be represented by the detection coordinates represent border points between the unit areas.

14. The storage medium according to claim 1, wherein the pointing device is a touch panel.

15. The storage medium according to claim 1, wherein the information processing program causes the computer to execute a predetermined processing using the detailed coordinates as inputs.

16. An information processing device capable of acquiring a detection result from a pointing device for detecting input to a predetermined instruction plane, wherein,
the pointing device detects a point in one of a plurality of unit areas at which input was made, the unit areas being arranged in a matrix in the instruction plane,
the information processing device comprises:
an input coordinate acquirer configured to repeatedly acquire detection coordinates for locating the unit area detected by the pointing device; and
a processor configured to repeatedly calculate in response to the acquisition of the detection coordinates by the acquirer, detailed coordinates by which a point in the instruction plane is represented with higher resolution than by the detection coordinates,
the processor further configured to calculate detailed coordinates indicating a point in the direction of a unit area indicated by previously acquired detection coordinates, as viewed from a predetermined reference point within a unit area indicated by currently acquired detection coordinates.

17. A coordinate calculation method for calculating coordinates based on a detection result from a pointing device for detecting a point in one of a plurality of unit areas at which input was made to a predetermined instruction plane, the unit areas being arranged in a matrix in the instruction plane, the method comprising:
repeatedly acquiring detection coordinates for locating the unit area detected b the pointing device in response to input; and using a processor, repeatedly calculating, in response to the acquisition of the detection coordinates in the acquisition step, detailed coordinates by which a point in the instruction plane is represented with higher resolution than by the detection coordinates, wherein, the detailed coordinates calculating includes calculating detailed coordinates which indicate a point in the direction of a unit area indicated by previously acquired detection coordinates, as viewed from a predetermined reference point within a unit area indicated by currently acquired detection coordinates.

18. A system comprising:

a pointing device for detecting input to a predetermined instruction plane, the pointing device detecting a point in one of a plurality of unit areas at which input was made, the unit areas being arranged in a matrix in the instruction plane, and a processor coupled to the pointing device, the processor being structured to:

repeatedly acquire detection coordinates for locating the unit area detected by the pointing device;

repeatedly calculate, in response to the acquisition of the detection coordinates by the acquisition, detailed coordinates by which a point in the instruction plane is represented with higher resolution than by the detection coordinates, and calculate detailed coordinates indicating a point in the direction of a unit area indicated by previously acquired detection coordinates, as viewed from a predetermined reference point within a unit area indicated by currently acquired detection coordinates.

19. The system of claim 18 wherein the detection coordinates are at a first resolution, and the detailed coordinates comprise coordinates at a second resolution higher than the first resolution.

* * * * *